June 8, 1926.  1,588,084
P. F. APFEL
COMBINED ELECTRIC RANGE AND WATER HEATER
Filed Oct. 4, 1923

INVENTOR
Philip F. Apfel
BY
Pierre Barnes
ATTORNEY

Patented June 8, 1926.

1,588,084

UNITED STATES PATENT OFFICE.

PHILIP F. APFEL, OF SEATTLE, WASHINGTON.

COMBINED ELECTRIC RANGE AND WATER HEATER.

Application filed October 4, 1923. Serial No. 666,435.

This invention relates to a combined electric range and water heater, and the general object of my invention is to provide improved devices of this character.

More specific objects and advantages of the invention will appear in the following specification.

The invention consists in the novel construction, arrangement and combination of parts hereinafter described and claimed.

In the accompanying drawing and in the following description I set forth in detail a certain arrangement of devices embodying the present invention, the disclosed means, however, constituting but one of various arrangements in which the principle of the invention may be applied.

In said drawing,—

Figure 1:
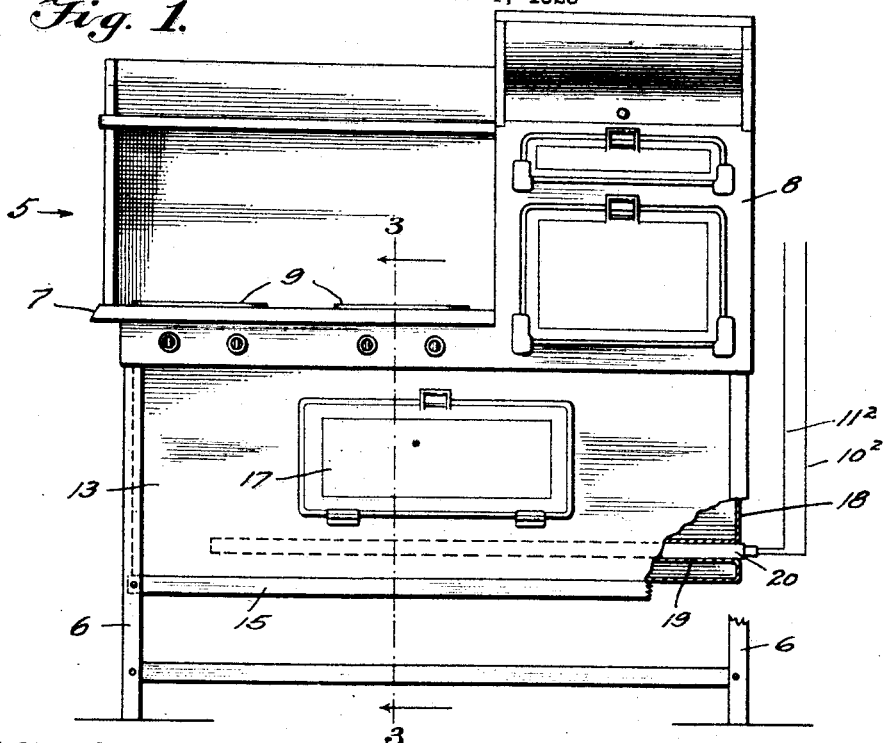
Figure 2:
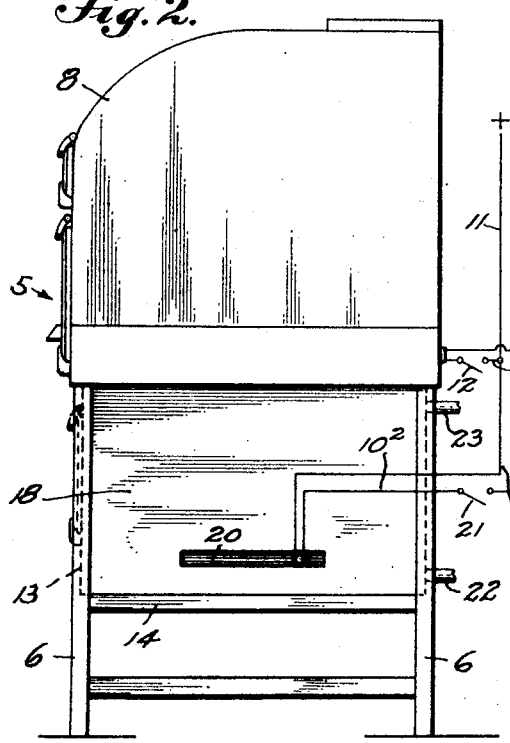
Figure 3:
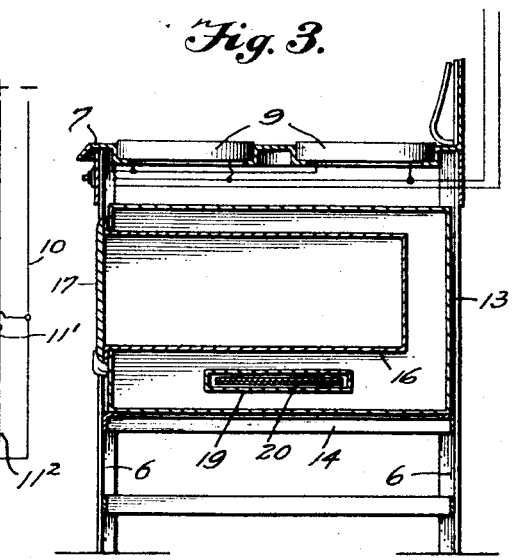

Figure 1 is a front elevation of a combined electirc range and water heater embodying my invention; and Fig. 2 is an end elevation of the same; and Fig. 3 is a vertical transverse section taken substantially through 3—3 of Fig. 1.

In said drawing, I illustrate an electric range having a body 5 which is supported by legs 6. The body 5 comprises a table portion 7 and an oven portion 8 provided with known or suitable electric heating units such, for example, as heating plates 9 with respect to said table portion.

The heating elements for the ovens are not shown. The circuit connections, generally, for said heating elements are indicated diagrammatically by 10 and 11—$11^1$ and includes a cut out switch 12, shown in Fig. 2.

The range so far described is or may be of any usual or suitable type.

According to the present invention a range is provided below the body thereof with a water heater in the nature of a tank 13 of rectangular shape, preferably, which as shown is supported by a frame work consisting of transverse and longitudinal bars 14 and 15 which are rigidly secured to the range legs 6. Said tank is provided with an inner casing 16 having an opening through the front wall of the tank 13 and constitutes a warming closet for dishes, food, etc.

The front opening of said warming closet is provided with a door 17. The top, bottom, back and side walls of the warming closet are in spaced relations with the respective walls of the tank 13.

Extending into the space below the warming closet 16 from the end wall 18 of the tank is a water-tight receptacle 19 for an electric heating element 20 which, as shown, is connected with the electric circuit wires 10 and 11 by leads $10^2$ and $11^2$ including a cut out switch 21, Fig. 2.

Adjacent its bottom and top respectively the water heating tank 13 is provided with water inlet and outlet pipes 22 and 23 whereby service connections are had with household hot-water plumbing fixtures.

The operation of my invention is as follows: Water supplied through pipe 22 into tank 13 fills the space or spaces therein surrounding the warming closet 16.

By closing switch 21 of circuit connections $10^2$—$11^2$ an electric current is afforded the heating element 21 to render the latter effective to transmit heat through the walls of the receptacle 19 to warm the surrounding water in tank 13. The water as it is thus heated ascends to be replaced by descending currents of water which, in turn, are heated, and so on. The hot water may be drawn off through the pipe 23.

The water heated in said tank acts against the outer surfaces of the walls of the warming closet to maintain the interior thereof in a warm condition.

The water heating tank and the heating elements of the range body may be employed separately or together by suitably regulating the switches 21 and 12.

Changes in the forms of the water heating tank, and the warming closet, with respect to the relative positions thereof with respect to each other and to the range body, may be made without departing from the spirit of the invention as defined in the appended claims.

What I claim, is,—

1. In apparatus of the character described, a water containing tank provided with water supply and draw-off pipes disposed in vertically spaced apart relation, a warming closet extending into the water space of said tank, a door for the opening of said closet, a water-tight receptacle extending into said tank in spaced relation below the oven, and an electric heating element provided within said receptacle for heating the oven through the medium of water contained within the tank.

2. An apparatus of the character described, comprising a hot water tank, an electric heating unit for heating the tank extending into the same and a warming closet extending into the hot water tank heated by the hot water therein.

3. An electric range comprising a hot water tank having inlet and discharge connections, a warming oven positioned within said tank surrounded by water and heated thereby, and an electric heating element within said tank for heating the water.

Signed at Seattle, Washington, this 29th day of September, 1923.

PHILIP F. APFEL.